US009666014B2

(12) United States Patent
Tyson

(10) Patent No.: US 9,666,014 B2

(45) Date of Patent: May 30, 2017

(54) CHARACTER NAMEPLATE KIOSK AND METHOD FOR MAKING A PERSONALIZED NAMEPLATE

(75) Inventor: Henry Tyson, Orlando, FL (US)

(73) Assignee: COLORVISION INTERNATIONAL, INC., Orlando, FL (US)

( * ) Notice: Subject to any disclaimer, the term of this patent is extended or adjusted under 35 U.S.C. 154(b) by 588 days.

(21) Appl. No.: 12/772,678

(22) Filed: May 3, 2010

(65) Prior Publication Data

US 2010/0280657 A1 Nov. 4, 2010

Related U.S. Application Data

(60) Provisional application No. 61/174,537, filed on May 1, 2009.

(51) Int. Cl.

*G06F 17/00* (2006.01)
*G06Q 20/00* (2012.01)
*G07F 17/16* (2006.01)
*G07F 17/26* (2006.01)

(52) U.S. Cl.

CPC .............. *G07F 17/16* (2013.01); *G07F 17/26* (2013.01)

(58) Field of Classification Search

CPC ........... G07F 17/16; G07F 17/26; G07F 17/42
USPC .................................................. 700/233, 235
See application file for complete search history.

(56) References Cited

U.S. PATENT DOCUMENTS

| | | | | |
|---|---|---|---|---|
| 2,912,066 A | | 11/1959 | Ellithorpe | |
| 4,179,723 A | | 12/1979 | Spencer | 361/384 |
| 5,513,117 A | * | 4/1996 | Small | 700/233 |
| 5,717,597 A | * | 2/1998 | Kara | G07B 17/00508 700/231 |
| 5,737,729 A | * | 4/1998 | Denman | 705/401 |
| 5,748,484 A | * | 5/1998 | Cannon et al. | 700/233 |
| 7,036,076 B2 | * | 4/2006 | Anwar | 715/255 |
| 7,236,258 B2 | * | 6/2007 | Wen | G06Q 10/107 355/40 |
| 7,472,910 B1 | * | 1/2009 | Okada | B41J 3/4075 358/1.15 |
| 7,668,619 B2 | * | 2/2010 | Torian | 700/233 |
| 7,751,069 B2 | * | 7/2010 | Wen | G06Q 10/107 283/67 |
| 7,894,935 B1 | * | 2/2011 | Hagen et al. | 700/235 |
| 7,983,924 B2 | * | 7/2011 | Garrison | 705/1.1 |
| 2002/0163547 A1 | * | 11/2002 | Abramson et al. | 345/855 |
| 2003/0036956 A1 | * | 2/2003 | Karas et al. | 705/14 |
| 2003/0054326 A1 | * | 3/2003 | Aaron-Barrada | G09B 19/0076 434/236 |

(Continued)

*Primary Examiner* — Michael K Collins

(74) *Attorney, Agent, or Firm* — Allen, Dyer, Doppelt & Gilchrist, P.A.

(57) ABSTRACT

A computer-implemented kiosk for making a personalized nameplate includes a transaction device to receive payment for the personalized nameplate to be made, and a controller is coupled to the transaction device and operates in response to the received payment. The controller includes a memory for storing at least one animated character set. An input device is coupled to the controller to be operated by a user to enter a name as it is to appear on the personalized nameplate, and a display is coupled to the controller to display the entered name using the at least one animated character set. A printer is coupled to the controller for printing the personalized nameplate with the entered name using the at least one animated character set.

20 Claims, 17 Drawing Sheets

(56) References Cited

U.S. PATENT DOCUMENTS

| | | | | |
|---|---|---|---|---|
| 2003/0222874 | A1* | 12/2003 | Kong | H04L 12/58<br>345/473 |
| 2004/0001219 | A1* | 1/2004 | Wen | G06Q 10/107<br>358/1.15 |
| 2005/0038558 | A1* | 2/2005 | Keene | 700/235 |
| 2005/0181336 | A1* | 8/2005 | Bakalian | 434/157 |
| 2007/0145734 | A1* | 6/2007 | Wen | G06Q 10/107<br>283/67 |
| 2007/0202242 | A1* | 8/2007 | Cielo | A23G 3/0097<br>426/660 |
| 2007/0247666 | A1* | 10/2007 | Tsitoukis | G06Q 20/18<br>358/1.18 |
| 2009/0165343 | A1* | 7/2009 | Miller | G06Q 30/02<br>40/124.06 |

* cited by examiner

110

FIG. 17
132
THANK YOU FOR SHOPPING WITH US TODAY.
PLEASE TRY AGAIN SOON.
DONE

CHARACTER NAMEPLATE KIOSK AND METHOD FOR MAKING A PERSONALIZED NAMEPLATE

RELATED APPLICATIONS

This application claims the benefit of U.S. Provisional Application Ser. No. 61/174,537 filed May 1, 2009, the entire contents of which are incorporated herein by reference.

FIELD OF THE INVENTION

The present invention relates to kiosks, and more particularly, to a kiosk providing personalized nameplates.

BACKGROUND OF THE INVENTION

Kiosk or vending booths may be used to provide engraved tags or nameplates, such as those attached to the collar of a pet. In this example, the user selects the style of the tag and the type of font to be used. After the necessary steps have been completed, then the tag is dispensed from the kiosk. Although effective, there is still a need to provide other types of kiosks or vending booths providing personalized tags or nameplates.

SUMMARY OF THE INVENTION

In view of the foregoing background, it is therefore an object of the present invention to provide a kiosk that makes personalized nameplates.

This and other objects, features, and advantages in accordance with the present invention are provided by a computer-implemented kiosk for making a personalized nameplate comprising a transaction device to receive payment for the personalized nameplate to be made, and a controller coupled to the transaction device and operating in response to the received payment. The controller may comprise a memory for storing at least one animated character set. An input device may be coupled to the controller to be operated by a user to enter a name as it is to appear on the personalized nameplate.

A display may be coupled to the controller to display the entered name using the at least one animated character set. At least one printer is coupled to the controller for printing the personalized nameplate with the entered name using the at least one animated character set. The input device may comprise a touch screen, and the touch screen may be overlaid on the display.

The controller may comprise an Internet connection for connecting to the Internet. The Internet connection may allow the computer-implemented kiosk to be remotely monitored. The Internet connection allows a new animated character set to be added to the memory. The input device may also allow the user to enter an email address so that the personalized nameplate is to be sent to the email address. The personalized nameplate may then be sent as an animated flash email.

The animated character set may be based upon a theme. The theme may comprise at least one of insects, animal sea life and children in different poses.

The controller may cause a screen saver to be displayed on the display when the input device is inactive for a defined period of time. The computer-implemented kiosk may further comprise a printer for printing a receipt in response to the transaction device receiving payment.

Another aspect is directed to a method for operating a computer-implemented kiosk for making a personalized nameplate, the computer-implemented kiosk is as described above. The method comprises a user providing payment to the transaction device for the personalized nameplate to be made, activating the controller in response to the received payment, and the user entering a name via the input device as it is to appear on the personalized nameplate. The entered name is displayed on the display using the at least one animated character set. The method may further comprise printing the personalized nameplate with the entered name using the at least one animated character set.

DETAILED DESCRIPTION OF THE PREFERRED EMBODIMENTS

The present invention will now be described more fully hereinafter with reference to the accompanying drawings, in which preferred embodiments of the invention are shown. This invention may however, be embodied in many different foists and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-5, a character namemaker kiosk 20 is configured to make personalized nameplates 30. In making a personalized nameplate 30, the alphabet is represented as an animated character set 40 from which letters are used to spell the name on the nameplate. In the illustrated example, the animated character set 40 is based on insects. For example, the illustrated nameplate 30 spells "Henry Tyson" using the animated insect character set.

Figure 1:
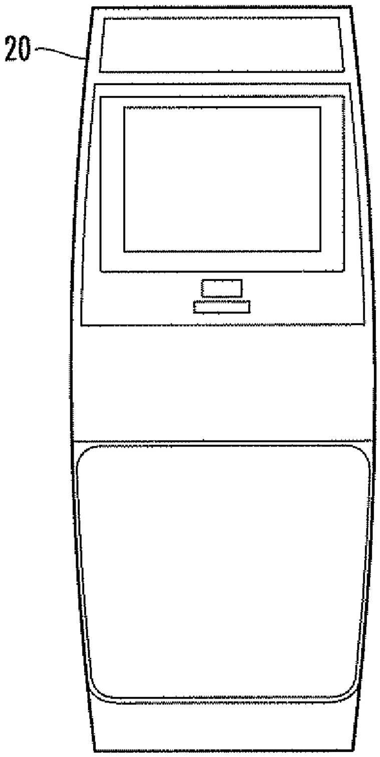
FIGS. 1-3 are perspective views of a character namemaker kiosk in accordance with the present invention.
Figure 2:
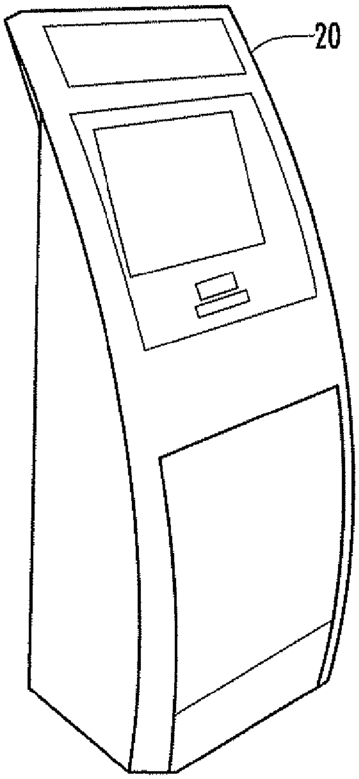
Figure 3:
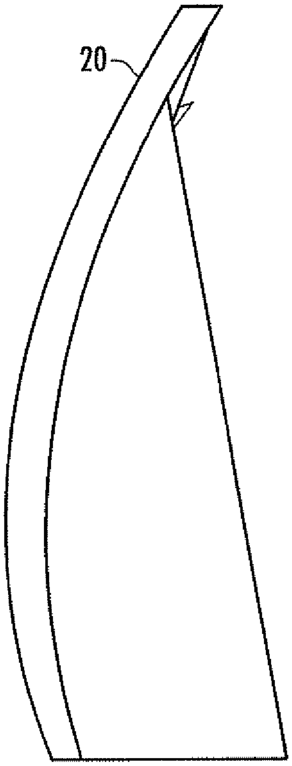
Figure 4:
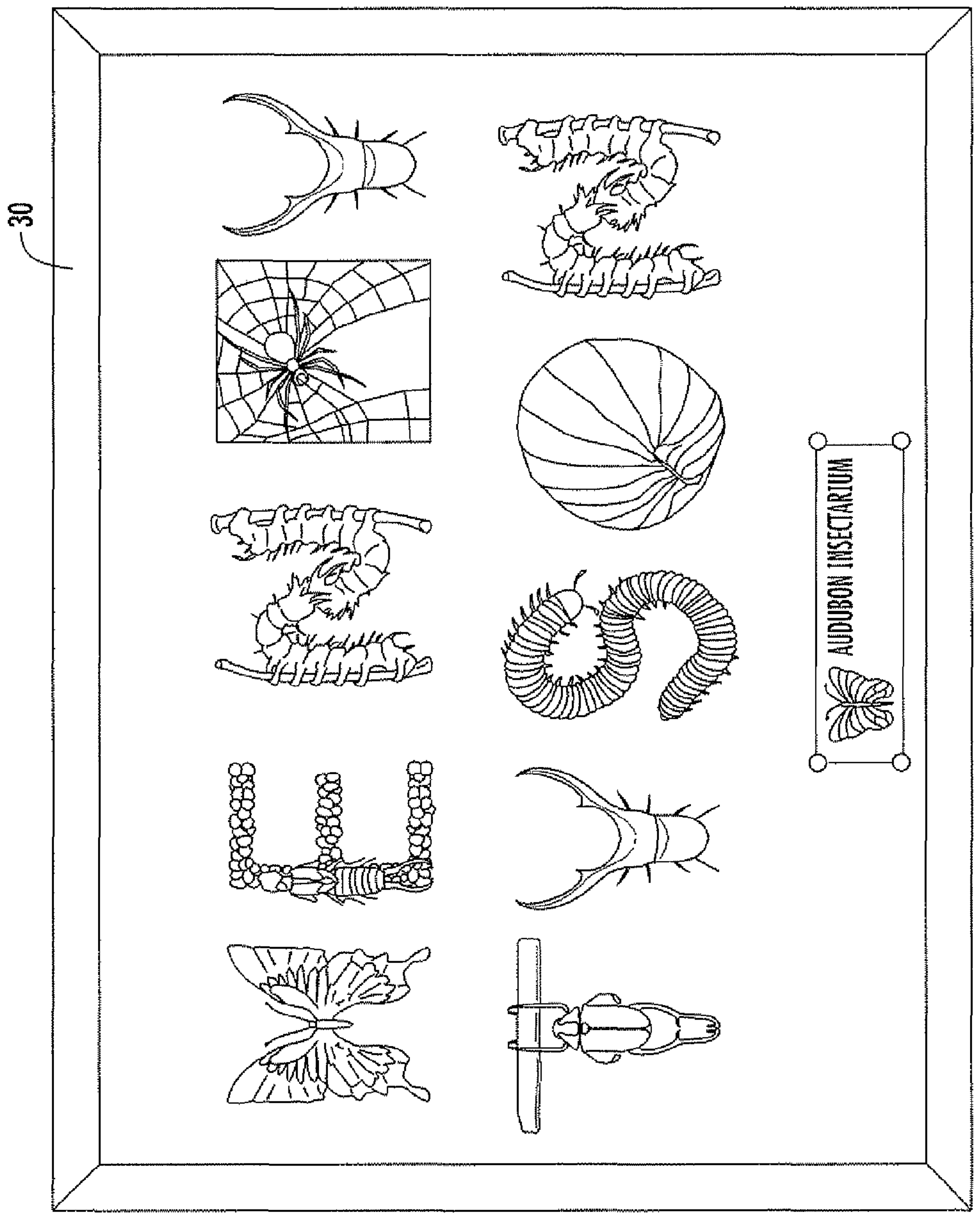
FIG. 4 is a personalized nameplate generated by the character namemaker kiosk shown in FIG. 1.
Figure 5:
FIG. 5 is an example of an animated character set in accordance with the present invention.
Figure 6:
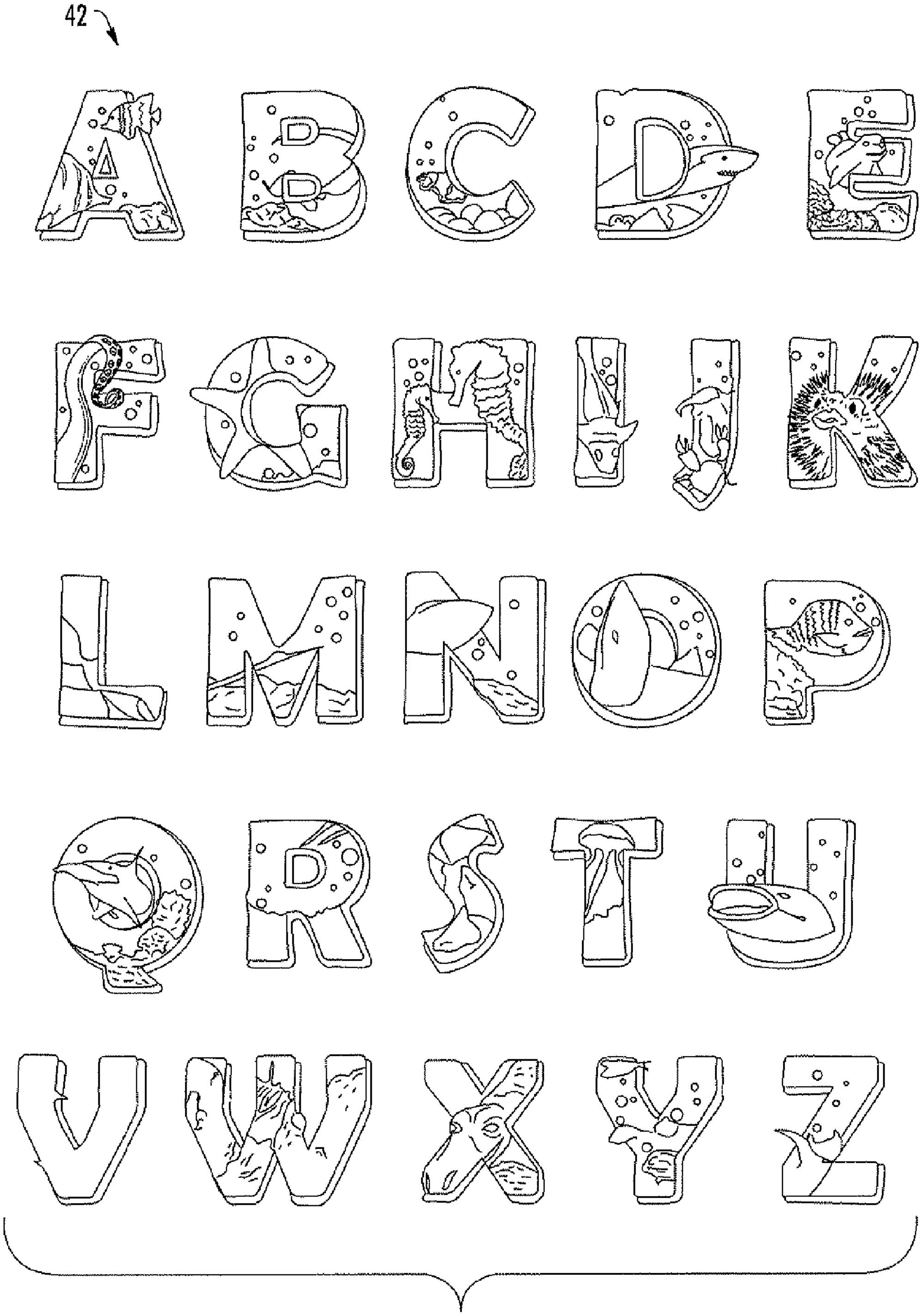
FIGS. 6-7 are further examples of an animated character set in accordance with the present invention.
Figure 7:
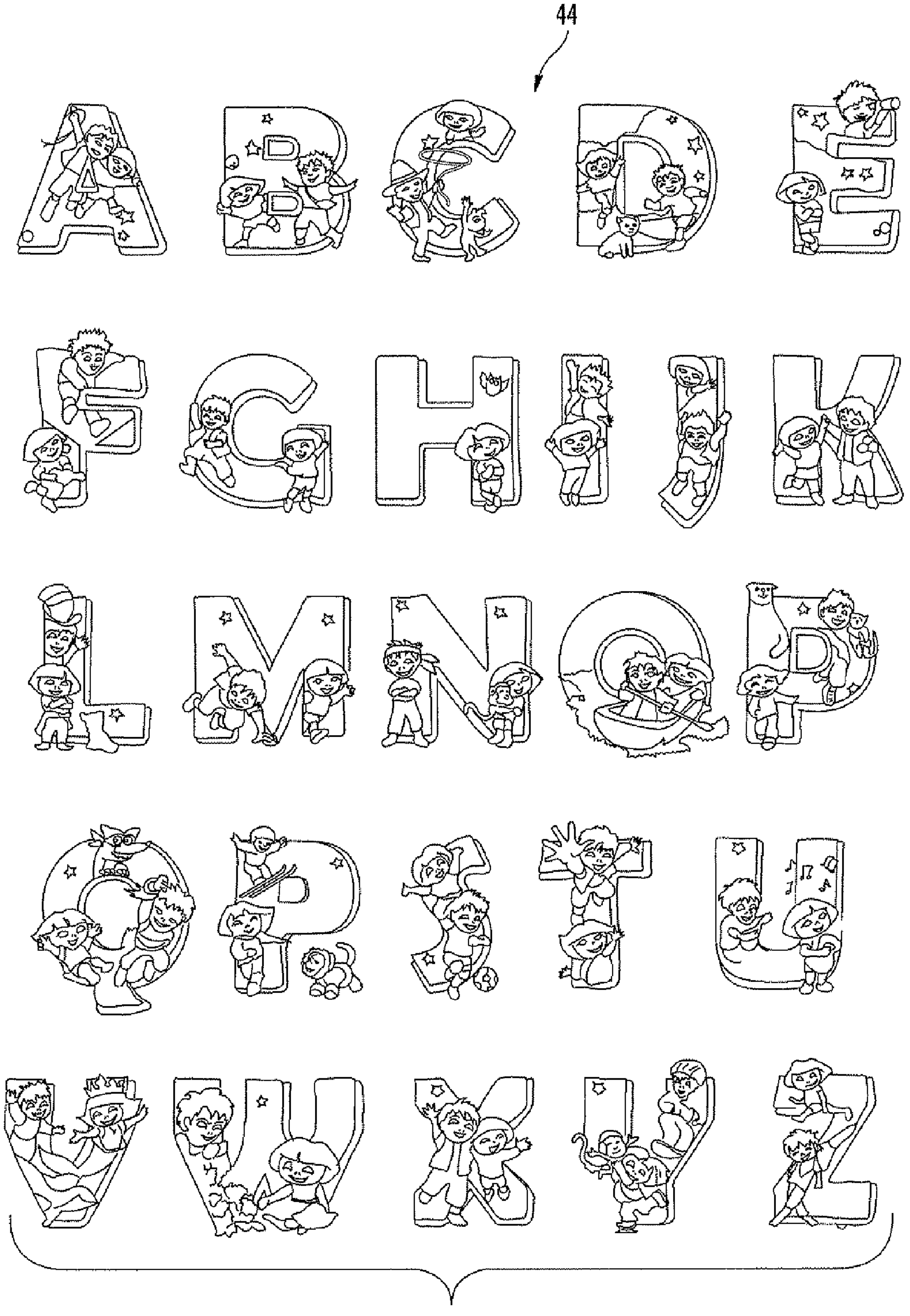

The animated character set 40 is not limited to any particular characters or objects. Additional examples of an animated character set 40 include animal sea life 42 and small children 44 in different poses, for example, as illustrated in FIGS. 6 and 7. Selection of the animated character set 40 largely depends on where the character namemaker kiosk 20 is to be placed. The character namemaker kiosk 20 may be placed at science museums, aquariums, theme parks, airports, etc.

Figure 8:
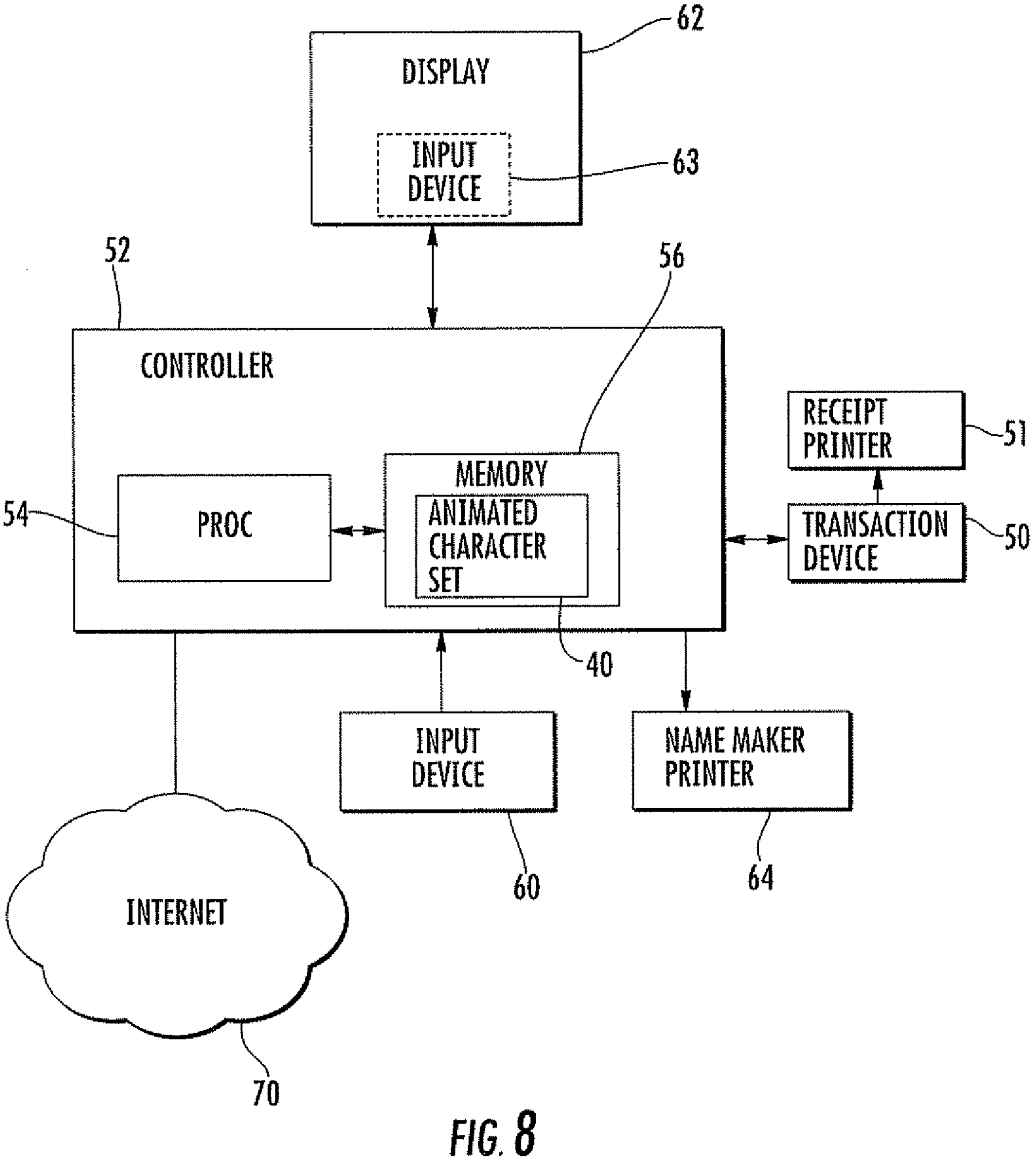
FIG. 8 is a block diagram of a character namemaker kiosk in accordance with the present invention.

As illustrated in FIG. 8, a block diagram of the character namemaker kiosk 20 will now be discussed. The character namemaker kiosk 20 is also referred to as a computer-implemented kiosk since it is computer driven and Internet accessed.

A transaction device 50 is to receive payment before the personalized nameplate 30 is to be made. Cash and/or credit cards may be accepted by the transaction device 50. Alternatively, the transaction device 50 may be set up to receive tokens, for example. A transaction printer 51 is coupled to the transaction device 50 for printing a payment receipt. Alternatively, the transaction printer is built into the transaction device 50.

A controller 52 is coupled to the transaction device 50 and operates in response to the received payment. The controller 52 comprises a processor 54, and a memory 56 for storing at least one animated character set 40. As illustrated, the memory 56 is separate from the processor 54. Alternatively, the memory may be included in the processor 54.

An input device 60 is coupled to the controller 52. The input device 60 may be a touch screen, and is to be operated by a user to enter a name as it is to appear on the personalized nameplate 30. A display 62 is coupled to the controller to display the entered name using the animated character set 40. Alternatively, the input device 60 may be overlaid with the display 62 as a touch screen, as indicated by the dashed profile 63 as also shown in FIG. 8. A nameplate printer 64 is coupled to the controller 52 for printing the personalized nameplate 30 with the entered name using the animated character set 40.

The character namemaker kiosk 20 may also be connected to the Internet 70. This advantageously allows the character namemaker kiosk 20 to be remotely monitored. In addition, updates can be remotely made to the kiosk 20, such as adding new alphabets that are based on new animated character sets. Remote testing may also be performed.

Figure 9:
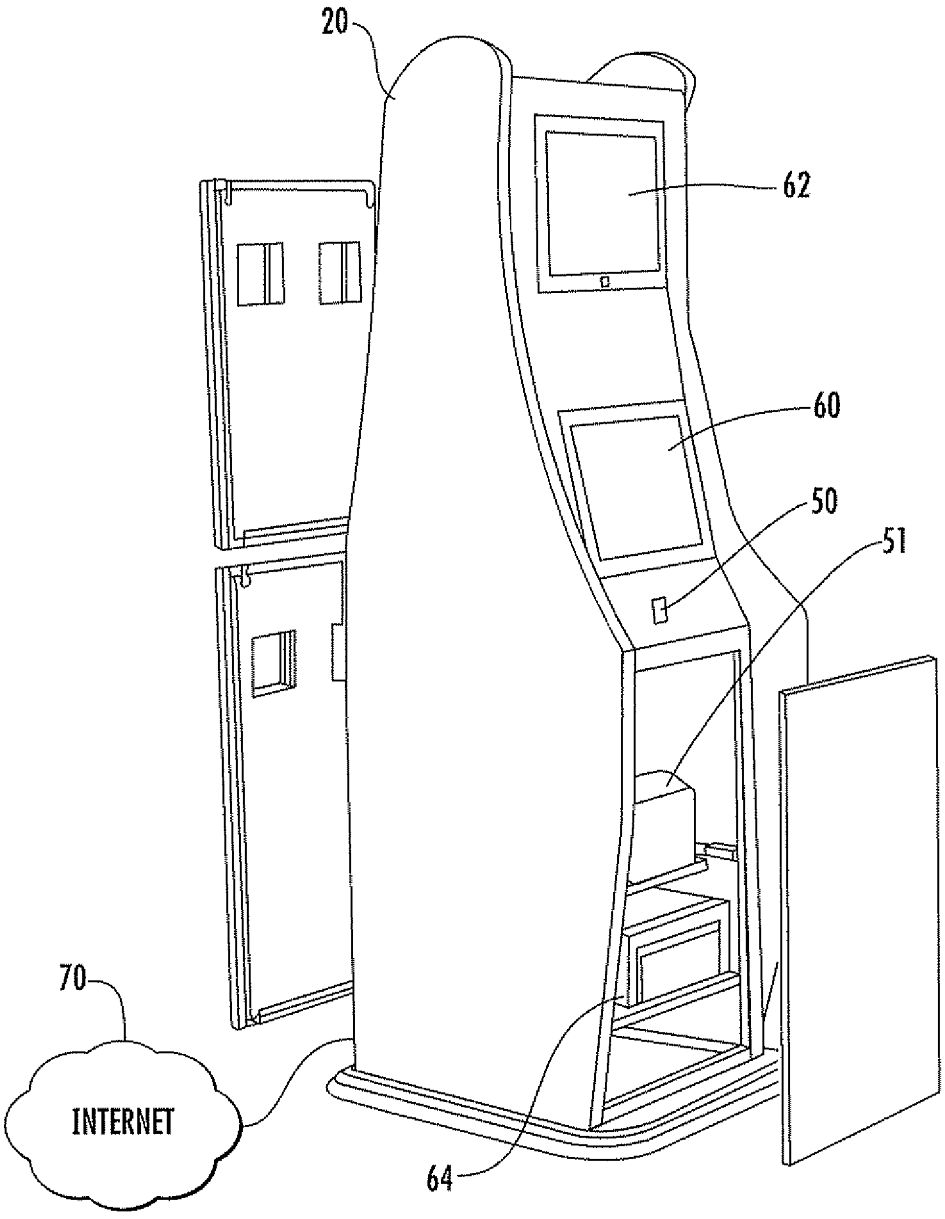
FIG. 9 is an exploded perspective view of a character namemaker kiosk in accordance with the present invention.
Figure 10:
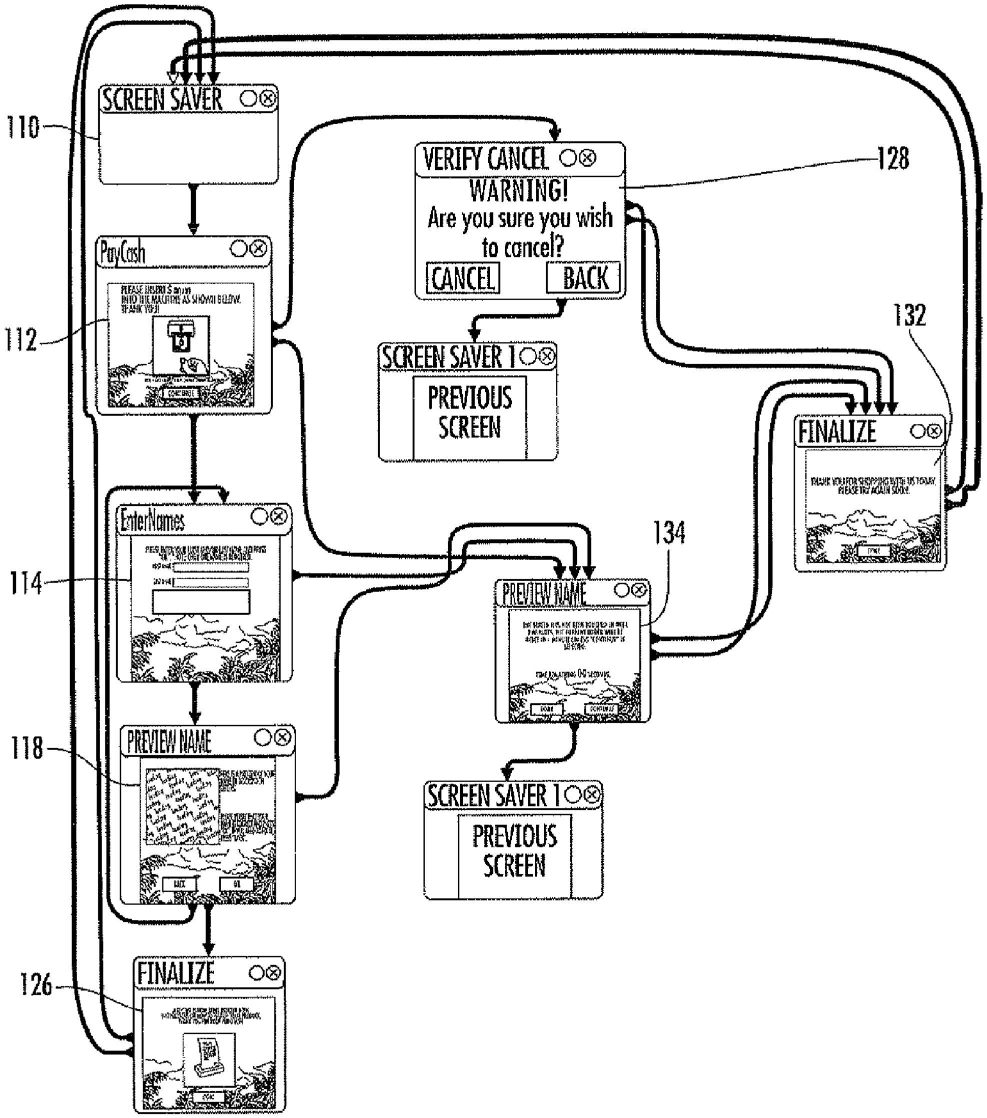
FIG. 10 is a flowchart illustrating a sequence of screen displays when operating the character namemaker kiosk in accordance with the present invention.

Referring now to FIG. 9, an exploded view of the character namemaker kiosk 20 will now be discussed in reference to FIG. 9. In this embodiment, the input device 60 is separate from the display 62. As discussed above, the input device 60 may be a touch screen where the user enters the name that is to appear on the nameplate 30. The display 62 displays how the nameplate 30 is to appear when printed.

The character namemaker kiosk 20 as illustrated includes two separate printers 51, 64. One of the printers 64 prints out the personalized nameplate 30 as it appears on the display 62. The other printer 51 prints out a transaction receipt for the user.

The transaction device 50 is positioned below the input device 60 and receives payment from the user. Although not illustrated, the controller 52 interfaces with the different devices/components within the character namemaker kiosk 20.

A flowchart 100 of the different screen displays used by the character namemaker kiosk 20 when providing a personalized nameplate 30 will now be discussed in reference to FIGS. 10-18. An overview or sequencing of the different screen displays is provided in FIG. 10.

Figure 11:
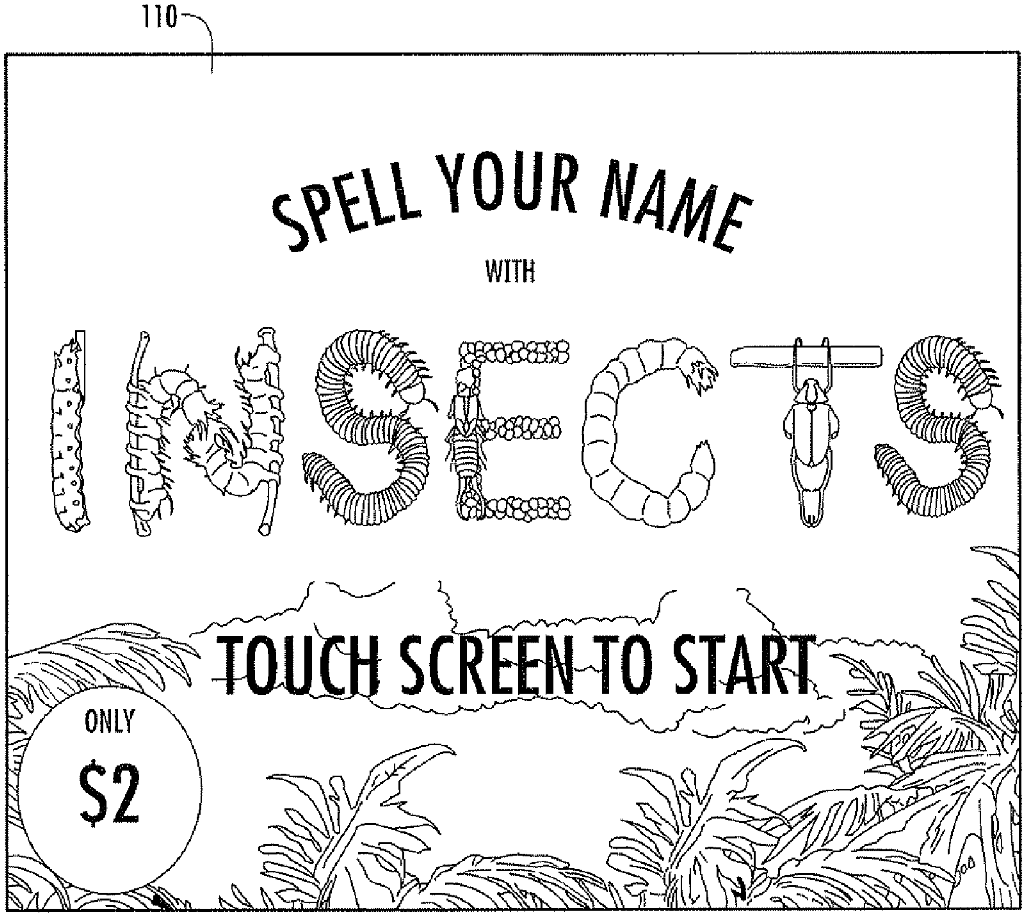
FIGS. 11-18 are individual views of the displays provided in the flowchart illustrated in FIG. 10.

When the character namemaker kiosk 20 is not in use, a screen saver 110 appears on the display 62, as illustrated in FIG. 11. In the illustrated example, a person's name will be spelled with insects. The character namemaker kiosk 20 becomes active when the user touches the screen saver 110.

Figure 12:
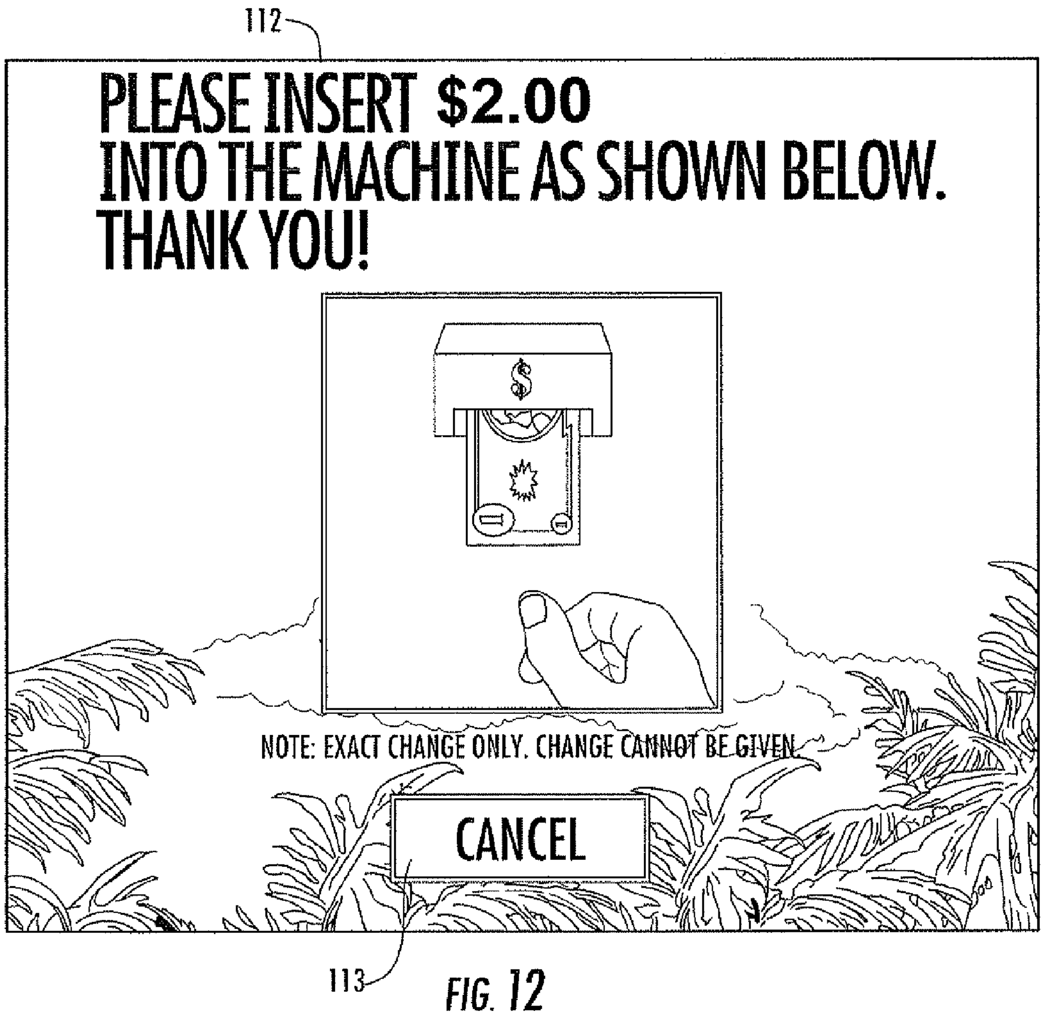

After touching the screen saver 110 to start the process, the next screen display is a transaction screen display 112, as provided in FIG. 12. Using the transaction device 50, cash/credit card/token may be used to pay for the personalized nameplate 30.

Figure 13:
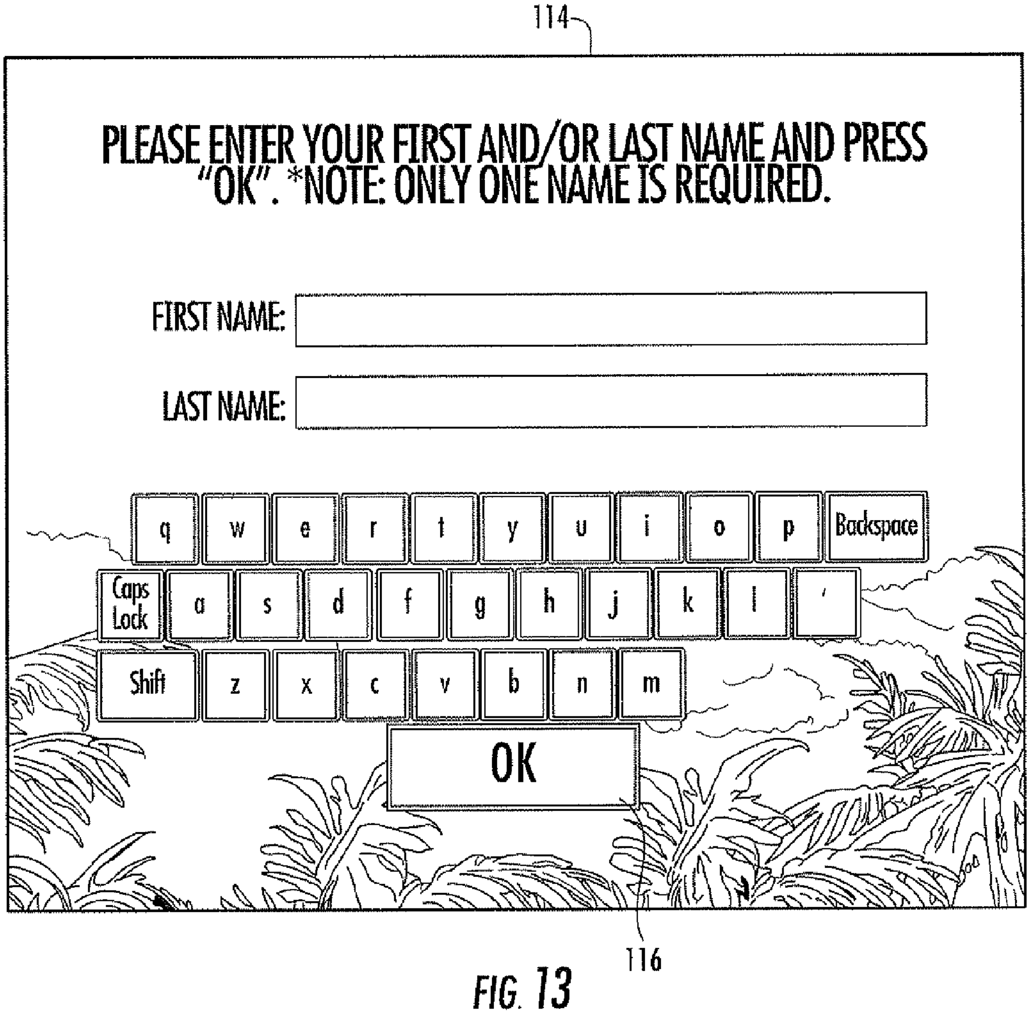

After payment has been made, the input device 60 provides a name entry display 114, as provided in FIG. 13, wherein the user spells the first and last name as it is to appear on the personalized nameplate 30. Once the name has been typed, the user selects the OK prompt 116. In alternate embodiments, the character namemaker kiosk 20 allows the user to select among more than one animated character set 40.

Figure 14:
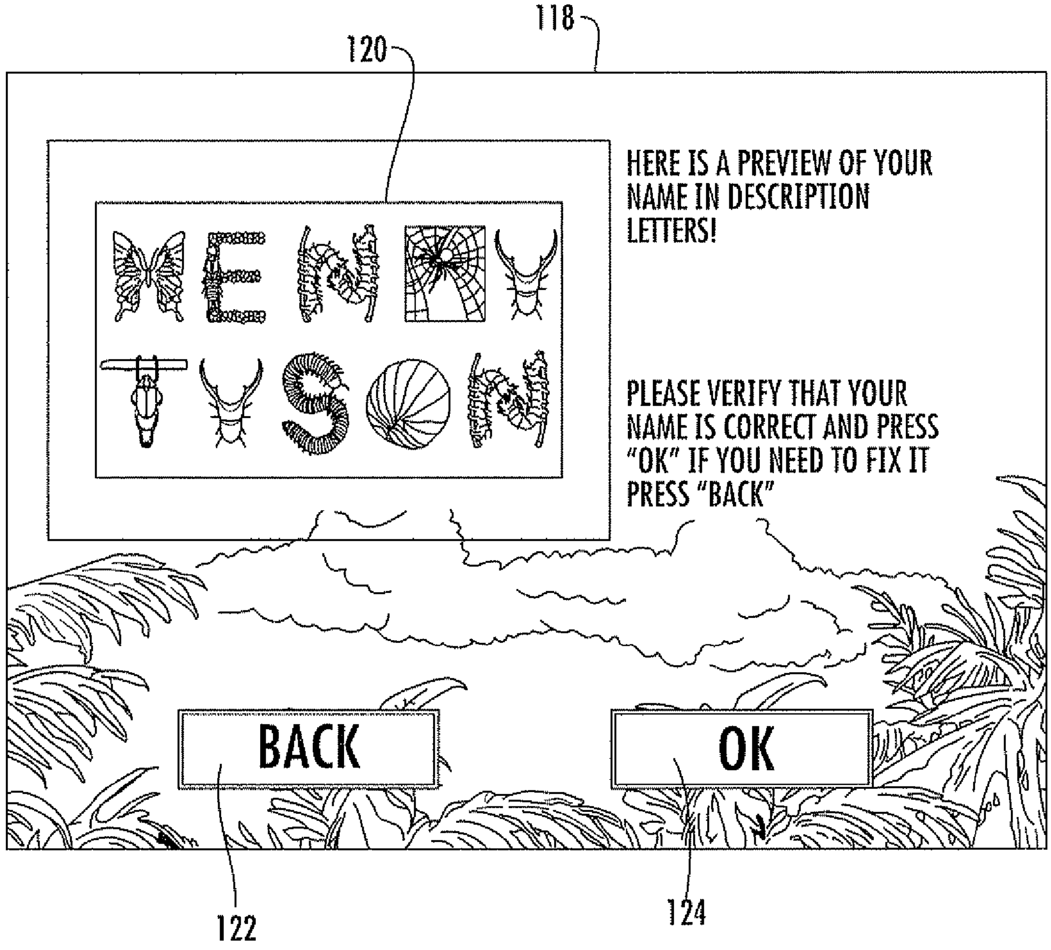

In FIG. 14, display 118 provides a preview in field 120 of how the name will appear on the personalized nameplate 30. If the name is incorrect, then the user can go back to the name entry display 114 by selecting the back prompt 122 and correct. Otherwise, the user selects the ok prompt 124 so that the personalized nameplate 30 can be printed by the nameplate printer 64.

Figure 15:
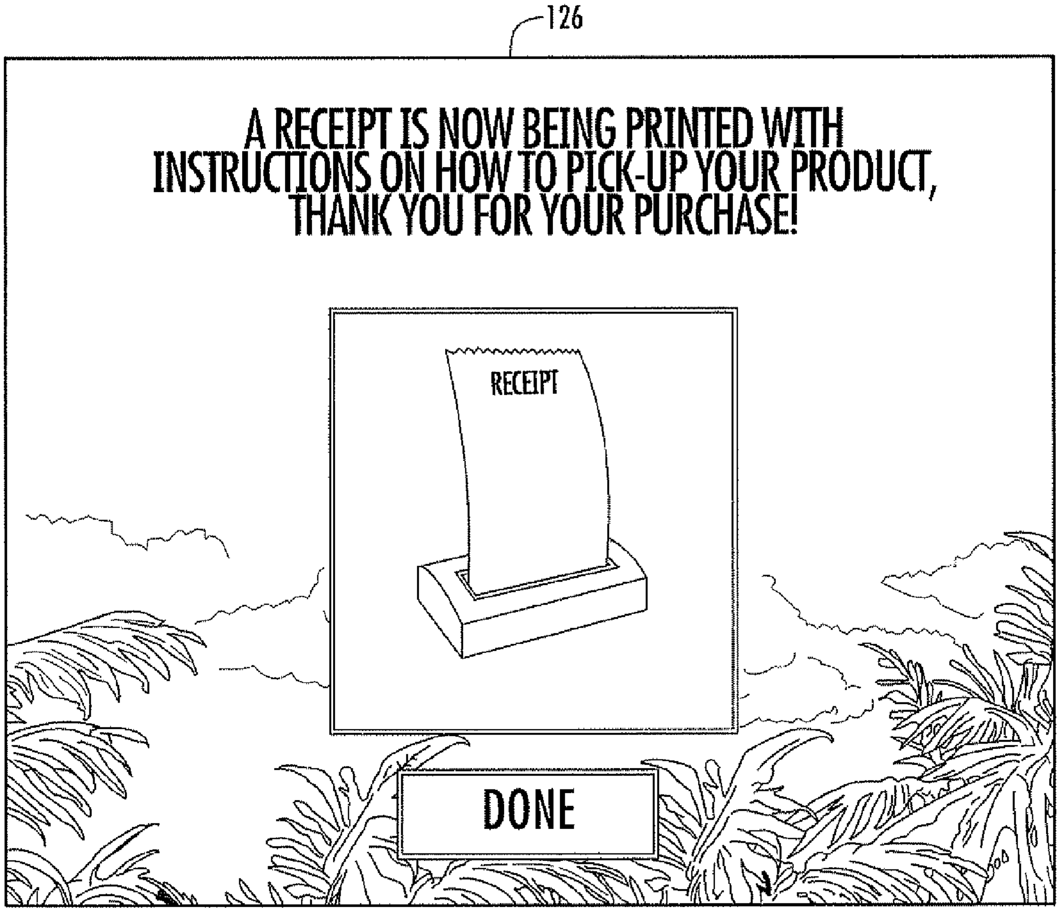

As the personalized nameplate 30 is being printed, the next display is a print screen display 126. As illustrated in FIG. 15, instructions are provided to the user on how to pick up the personalized nameplate 30. The pick up instructions may be provided directly on the screen display 126, or they may be provided on a separate receipt printed out by the one of the printers 51, 64.

Figure 16:
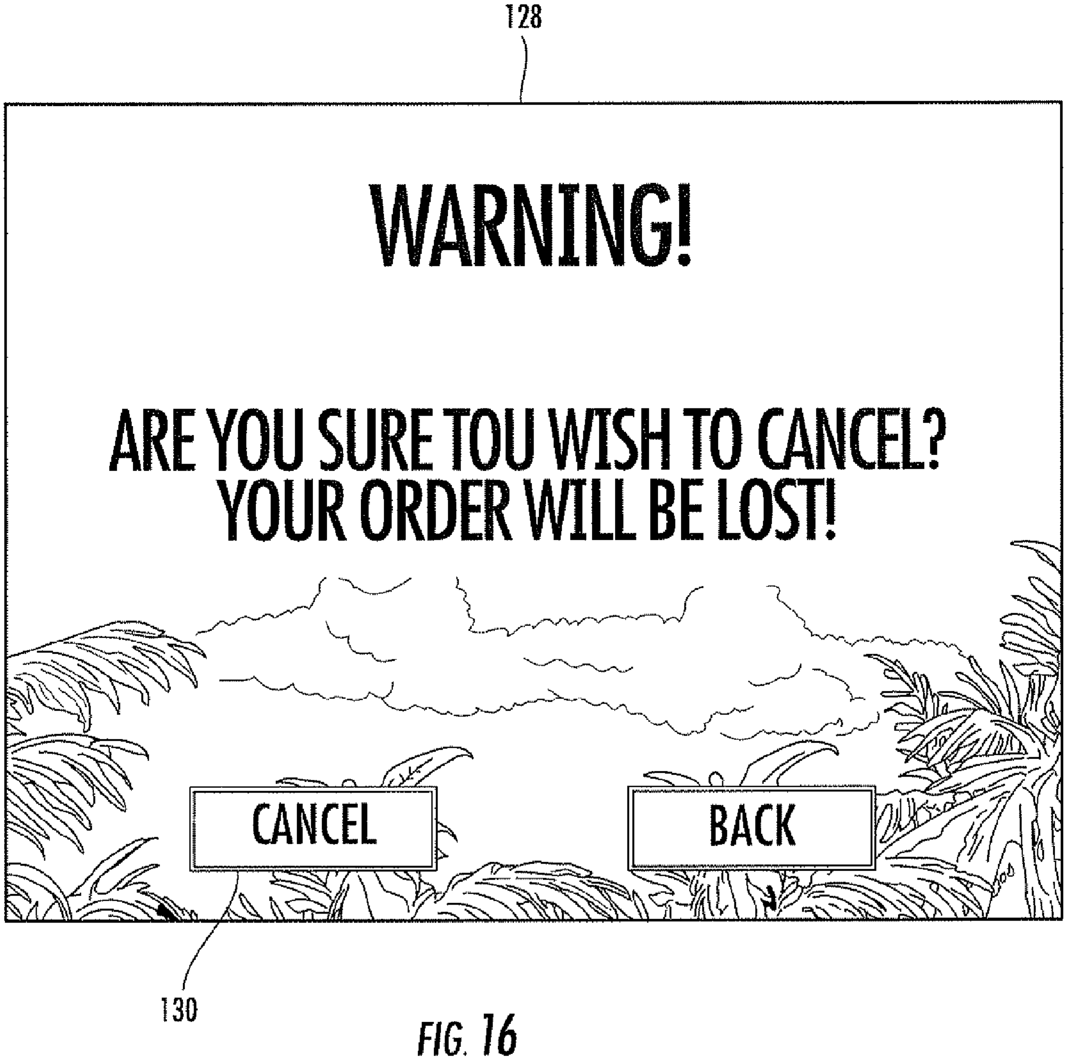
Figure 17:
Figure 18:
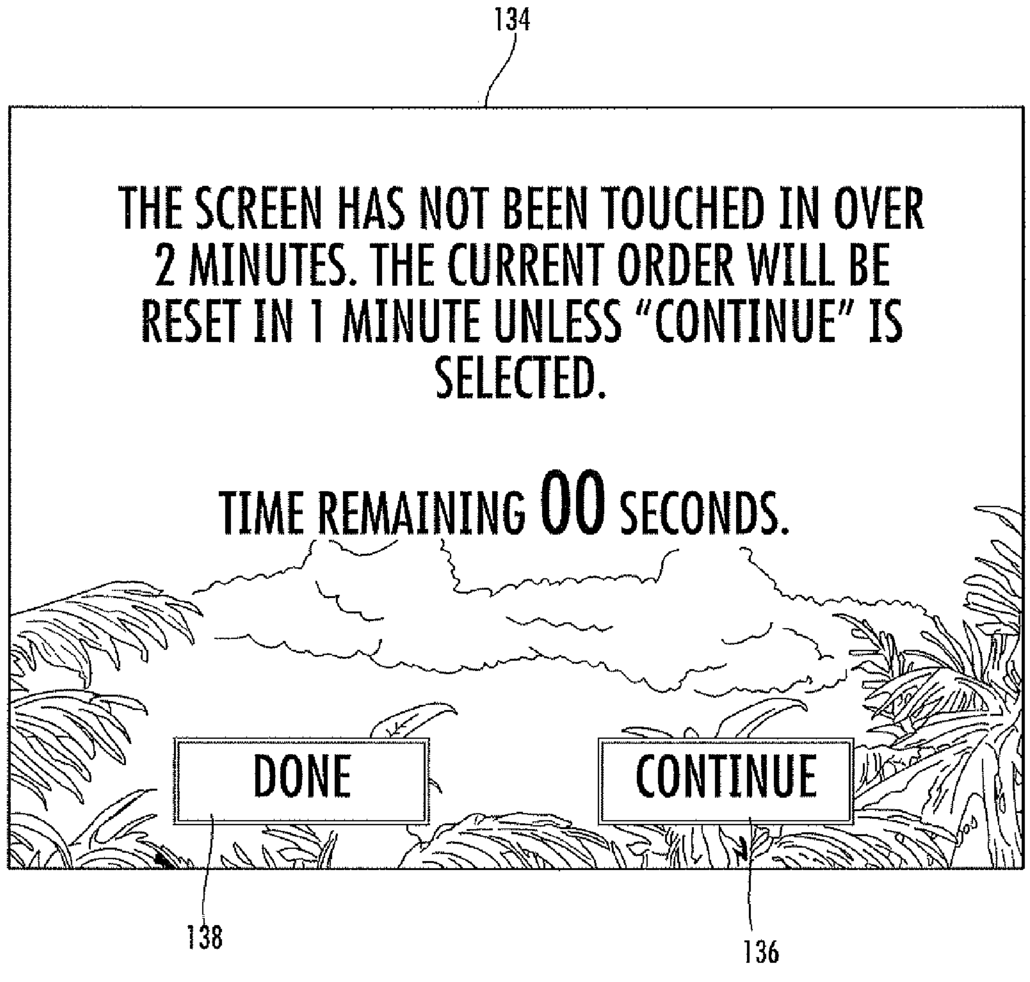

If in the initial transaction screen display 112 the user selects the cancel prompt 113, then a warning display 128 is provided, as illustrated in FIG. 16. If the user confirms selection of the cancellation by selecting the cancel prompt 130, then screen display 132 is provided, as illustrated in FIG. 17. If the user takes too long on the name entry display 114, then screen display 134 is provided, as illustrated in FIG. 18. At this point, the user has the option to select the continue prompt 136 or the done prompt 138.

Another feature of the character namemaker kiosk 20 is to have the user enter an email address via the input device 60. The personalized nameplate 30 would then be sent to the email address as an animated flash email, as readily appreciated by those skilled in the art. For example, as each letter in the name appears on the recipient's computer screen as part of the animated flash email, it would be in an animated fashion. For example, in the name Henry Tyson as spelled in FIG. 4, the butterfly representing the letter H would appear as if it was flying onto the screen. For the letter B, the insect would lay the eggs forming the letter. This process continues for each of the different letters until the full name has been spelled. The recipient may then use this as their screen saver, for example.

Figure 19:
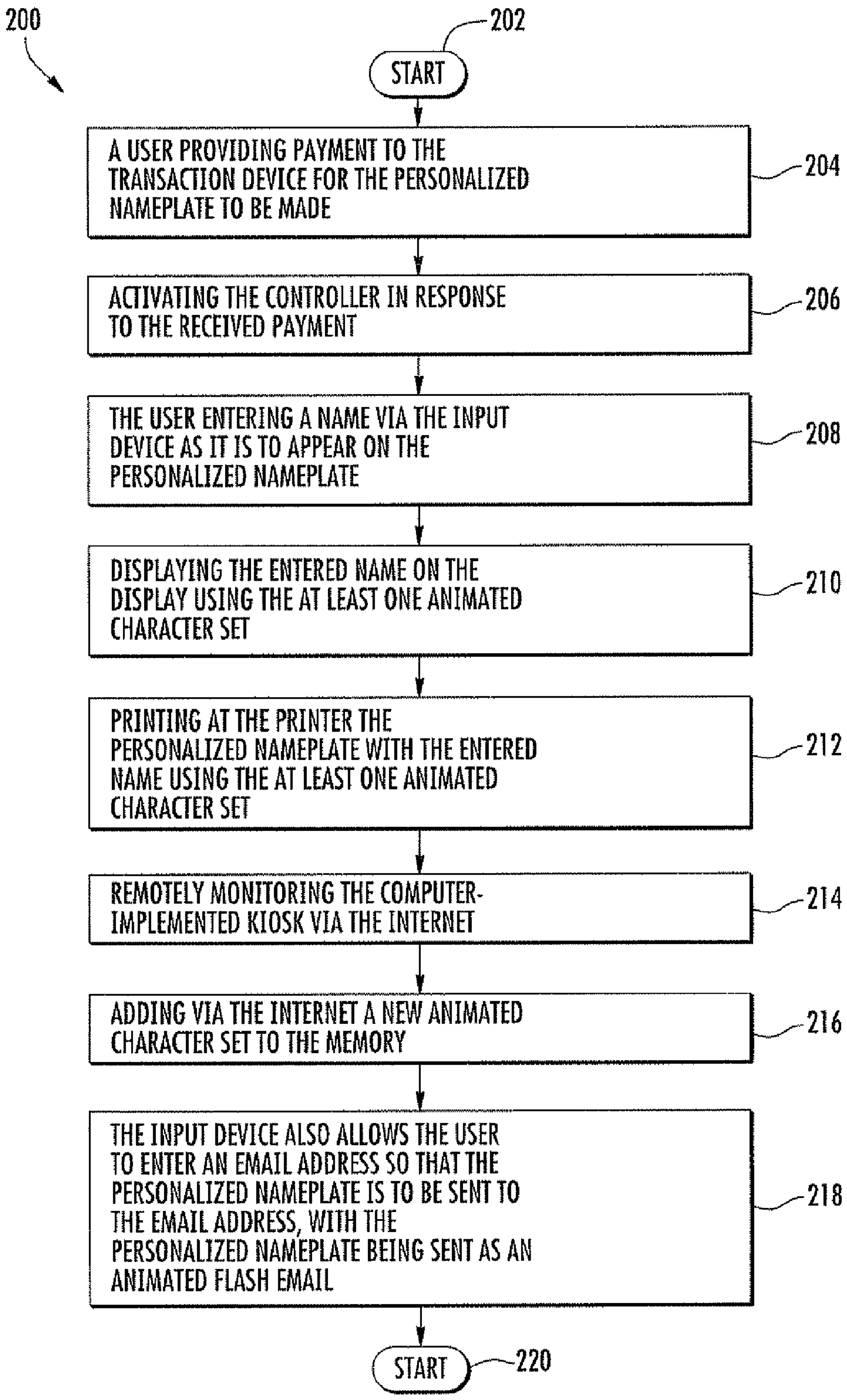
FIG. 19 is a flowchart illustrating a method for operating a character namemaker kiosk for making a personalized nameplate in accordance with the present invention.

Referring now to the flowchart 200 illustrated in FIG. 19, a method for operating a computer-implemented kiosk 20 for making a personalized nameplate 30 will be discussed. The computer-implemented kiosk 20 is as described above. From the start (Block 202), the method comprises a user providing payment to the transaction device 50 at Block 204 for the personalized nameplate 30 to be made. At Block 206, the controller 52 is activated in response to the received payment, and the user enters a name via the input device 60 at Block 208 as it is to appear on the personalized nameplate 30.

The entered name is displayed on the display 62 at Block 210 using the at least one animated character set. The personalized nameplate 30 is printed at Block 212 with the entered name using the at least one animated character set 40.

The method further includes remotely monitoring the computer-implemented kiosk 20 via the Internet 70 at Block 214. A new animated character set is added to the memory 56 via the Internet 70 at Block 216. The input device 60 also allows the user to enter an email address at Block 218 so that the personalized nameplate 30 is to be sent to the email address, with the personalized nameplate being sent as an animated flash email. The method ends at Block 220.

Yet another aspect of the character namemaker kiosk 20 is to have this concept apply to a web site in which a variety of different products in addition to personalized nameplates 30 may be made. For example, if the user wanted to have a themed birthday party, then the name of the birthday person and guests could all be printed on the party favors in the selected theme. For example, if the theme of the party is airplanes, then an animated character set in the form of airplanes would spell out the different names on the party favors, such as a happy birthday banner, plates and cups.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included herein.

That which is claimed is:

1. A computer-implemented kiosk for making a personalized nameplate comprising:

a structure;

a transaction device carried by said structure to receive payment for the personalized nameplate to be made;

a controller carried by said structure and coupled to said transaction device and operating in response to the received payment, said controller comprising a memory for storing at least one animated character set from which displayable letters are used to spell a name on the personalized nameplate, wherein a shape of each displayable letter of the at least one animated character set is based upon a theme, the theme comprising at least one of insects, animals, sea life and children in different poses;

an input device carried by said structure and coupled to said controller to be operated by a user to enter a name as it is to appear on the personalized nameplate;

a display carried by said structure and coupled to said controller and configured to display on a first screen the name as entered by the user, and after confirmation by the user that the name has been entered correctly, then display on a second screen the entered name using the at least one animated character set, where each displayable letter of the entered name is displayed based on the theme of the at least one animated character set; and at least one printer carried by said structure and coupled to said controller for printing the personalized nameplate with the entered name using the at least one animated character set;

said controller comprising an Internet connection for connecting to the Internet for allowing a new animated character set to be added to said memory, and with an Internet connection not required when making the personalized nameplate.

2. The computer-implemented kiosk according to claim 1 wherein said input device comprises a touch screen.

3. The computer-implemented kiosk according to claim 2 wherein said touch screen is overlaid on said display.

4. The computer-implemented kiosk according to claim 1 wherein the Internet connection allows the computer-implemented kiosk to be remotely monitored.

5. The computer-implemented kiosk according to claim 1 wherein said input device also allows the user to enter an email address so that the personalized nameplate is to be sent to the email address.

6. The computer-implemented kiosk according to claim 5 wherein the personalized nameplate is sent as an animated flash email, and as each displayable letter in the entered name appears on a recipient's display, each displayable letter moves across the display one at a time until the full name has been spelled.

7. The computer-implemented kiosk according to claim 1 wherein said controller causes a screen saver to be displayed on said display when said input device is inactive for a defined period of time.

8. The computer-implemented kiosk according to claim 1 further comprising a printer carried by said structure for printing a receipt in response to said transaction device receiving payment.

9. A method for operating a computer-implemented kiosk for making a personalized nameplate, the computer-implemented kiosk comprising a structure, a transaction device carried by the structure, a controller carried by the structure and coupled to the transaction device and comprising an Internet connection and comprising a memory for storing at least one animated character set from which displayable letters are used to spell a name on the personalized nameplate, wherein a shape of each displayable letter of the at least one animated character set is based upon a theme, the theme comprising at least one of insects, animals, sea life and children in different poses, an input device carried by the structure and coupled to the controller, a display carried by the structure and coupled to the controller, and at least one printer carried by the structure and coupled to the controller, the method comprising:

a user providing payment to the transaction device for the personalized nameplate to be made;

activating the controller in response to the received payment;

the user entering a name at the kiosk via the input device as it is to appear on the personalized nameplate, with each displayable letter in the name being based on the at least one animated character set;

displaying on a first screen of the display the name as entered by the user, and after confirmation by the user that the name has been entered correctly, then displaying on a second screen of the display the entered name using the at least one animated character set, where each displayable letter of the entered name is displayed based on the theme of the at least one animated character set;

printing at the printer the personalized nameplate with the entered name using the at least one animated character set; and operating the controller for connecting to the Internet for allowing a new animated character set to be added to the memory, and with an Internet connection not required when making the personalized nameplate.

10. The method according to claim 9 wherein the input device comprises a touch screen.

11. The method according to claim 10 wherein the touch screen is overlaid on the display.

12. The method according to claim 9 further comprising remotely monitoring the computer-implemented kiosk via the Internet.

13. The method according to claim 9 further comprising the user using the input device to enter an email address so that the personalized nameplate is to be sent to the email address.

14. The method according to claim 13 wherein the personalized nameplate is sent as an animated flash email.

15. The method according to claim 9 wherein the controller causes a screen saver to be displayed on the display when the input device is inactive for a defined period of time.

16. The method according to claim 9 further comprising printing a receipt in response to the transaction device receiving payment.

17. A computer-implemented kiosk for making a personalized nameplate comprising:

a structure;

a transaction device carried by said structure to receive payment for the personalized nameplate to be made;

a controller carried by said structure and coupled to said transaction device and operating in response to the received payment, said controller comprising a memory for storing at least one animated character set from which displayable letters are used to spell a name on the personalized nameplate, wherein a shape of each displayable letter of the at least one animated character set is based upon a theme, the theme comprising at least one of insects, animals, sea life and children in different poses;

an input device carried by said structure and coupled to said controller to be operated by a user to enter a name as it is to appear on the personalized nameplate; and a display carried by said structure and coupled to said controller and configured to display on a first screen the name as entered by the user, and after confirmation by the user that the name has been entered correctly, then display on a second screen the entered name using the at least one animated character set as is to appear on the personalized nameplate, where each displayable letter of the entered name is displayed based on the theme of the at least one animated character set.

18. The computer-implemented kiosk according to claim 17 further comprising at least one printer carried by said structure and coupled to said controller for printing the personalized nameplate with the entered name using the at least one animated character set.

19. The computer-implemented kiosk according to claim 17 wherein said controller comprises an Internet connection for connecting to the Internet for allowing a new animated character set to be added to said memory, and with an Internet connection not required when making the personalized nameplate, wherein the Internet connection allows the computer-implemented kiosk to be remotely monitored.

20. The computer-implemented kiosk according to claim 17 wherein the personalized nameplate is sent as an animated flash email, and as each displayable letter in the entered name appears on a recipient's display, each displayable letter moves across the display one at a time until the full name has been spelled.

* * * * *